United States Patent
Phillips

(10) Patent No.: US 6,925,949 B1
(45) Date of Patent: Aug. 9, 2005

(54) ELEVATED SAILING APPARATUS

(76) Inventor: Malcolm Phillips, 20 Washington Dr., Acton, MA (US) 01720

( * ) Notice: Subject to any disclaimer, the term of this patent is extended or adjusted under 35 U.S.C. 154(b) by 0 days.

(21) Appl. No.: 10/335,502

(22) Filed: Dec. 31, 2002

(51) Int. Cl.[7] .............................................. B63H 9/04
(52) U.S. Cl. .............................. 114/102.1; 114/39.29; 114/102.16; 114/102.29; 244/24
(58) Field of Search .......................... 114/39.13, 39.29, 114/102.1, 102.11, 102.16, 102.29; 244/24, 244/25, 29, 30, 31

(56) References Cited

U.S. PATENT DOCUMENTS

| | | | |
|---|---|---|---|
| 3,119,579 A | * | 1/1964 | Borgeson et al. .............. 244/31 |
| 4,296,704 A | | 10/1981 | Bridge |
| 4,497,272 A | | 2/1985 | Veazey |
| 4,601,444 A | * | 7/1986 | Lindenbaum ................ 244/26 |
| 5,366,182 A | | 11/1994 | Roeseler |
| 6,402,090 B1 | * | 6/2002 | Aaron ......................... 244/24 |

* cited by examiner

Primary Examiner—Sherman Basinger

(57) ABSTRACT

An elevated sailing apparatus that includes one or more wings, tethered to a conveyance, and suspended from beneath a streamlined, lighter-than-air blimp. The wings generate both propulsive and lifting forces from the wind. The propulsive force is used to propel a conveyance. The lifting force prevents the apparatus from being pushed into the water by the propulsive force. The wings use stabilizers to orient them to the oncoming wind and control surfaces to adjust the angle of orientation. A ballast weight provides a vertical reference relative to the blimp, so that the propulsive and lifting forces can be controlled independently. A remote control system allows the degree of lifting force and propulsive force to be controlled from the conveyance. Thus the pilot may tack the apparatus and control its altitude. The use of a streamlined blimp and high aspect-ratio wings allows this elevated sailing apparatus to achieve the low drag-angle necessary for high-speed sailing.

4 Claims, 5 Drawing Sheets

ELEVATED SAILING APPARATUS

CROSS-REFFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION—FIELD OF INVENTION

Figure 1:
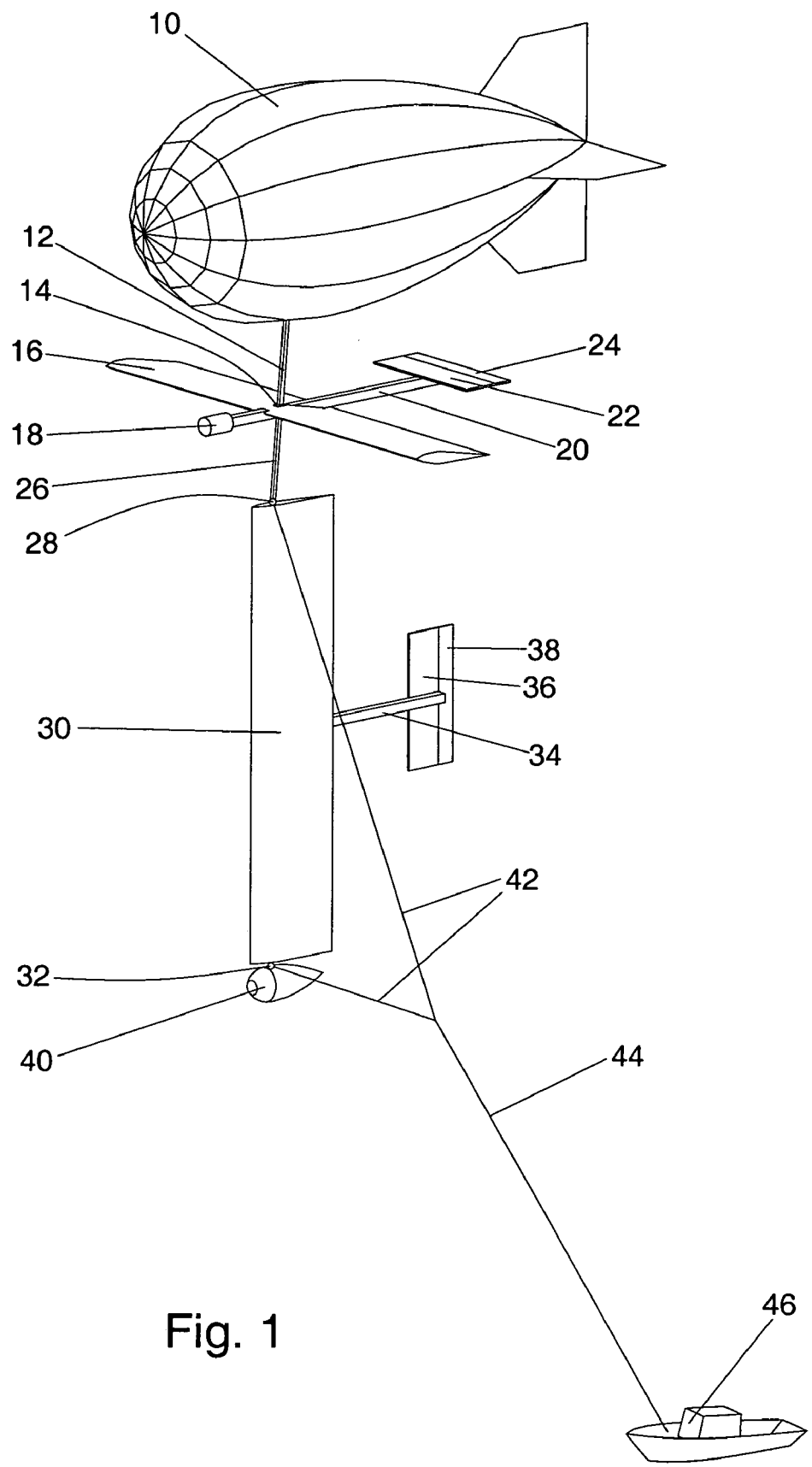

This invention relates to sailing apparatus, specifically an improved elevated sailing apparatus.

BACKGROUND OF THE INVENTION—DESCRIPTION OF PRIOR ART

Modern high-speed sailing can be characterized by the need for a righting moment to counter the heeling moment that is generated by the aerodynamic force developed by the sail. People have used kites to reduce the heeling moment. The aerodynamic force generated by the kite acts near the water line of the vessel, rather than part way up the mast. However, these kites usually have two (or four) kite lines, and require constant attention to control. They are also difficult to re-launch should they land in the water. U.S. Pat. No. 5,366,182 to Roeseler (1994) describes one method for addressing the launch/retrieval problem, but does not address the requirement of constant attention to control.

Another requirement for high-speed sailing is to have a low drag-angle (high lift-to-drag ratio) for the aerodynamic force acting on the sail. The Veazy U.S. Pat. No. 4,497,272 (1985) details a "mastless sail system" which is applicable to low-speed and downwind sailing. It does not have the features necessary to achieve the low drag-angle required for high-speed sailing. In particular the use of a balloon rather than a streamlined blimp, and the use of a low aspect-ratio kite or spinnaker rather than a high aspect-ratio wing or sail. His control is only described in terms of sheets. He does not describe the use of control mechanisms, which can be manipulated by radio control or automatic actuators. He would be unable use a single tether line and still control his sail.

BACKGROUND OF THE INVENTION—OBJECTS AND ADVANTAGES

Accordingly, several objects and advantages of my "Elevated Sailing Apparatus" are:
(a) Provide a propulsive force for boats, and other vehicles, that has the low drag-angle needed for high-speed sailing.
(b) Provide a propulsive force such that the heeling moment is negligible and the propulsive force is not limited by the righting moment available.
(c) Provide an increased propulsive force by utilizing the stronger winds available at about 100 ft above the water surface.
(d) Provide a propulsive force that can be transferred to the boat using a single tether.
(e) Provide a combination of static and dynamic lift so that the apparatus will remain in the air for a large range of wind speeds including zero wind speed.
(f) Provide an apparatus that is easy to launch and retrieve.
(g) Provide an apparatus that is dynamically stable so that constant attention is not required.
(h) Provide an apparatus that may be remotely controlled.
(i) Provide an apparatus that may be automatically controlled to maintain constant altitude.

Further objects and advantages will become apparent from a consideration of the ensuing description and drawings.

SUMMARY OF THE INVENTION

My Elevated Sailing Apparatus includes one or more wings, tethered to a conveyance, and suspended from beneath a streamlined, lighter-than-air blimp. The wings generate both propulsive and lifting forces from the wind. The propulsive force is used to propel a conveyance. The lifting force prevents the apparatus from being pushed into the water by the propulsive force. The wings use stabilizers to orient them to the oncoming wind and control surfaces to adjust the angle of orientation. A ballast weight provides a vertical reference relative to the blimp, so that the propulsive and lifting forces can be controlled independently. A remote control system allows the degree of lifting force and propulsive force to be controlled from the conveyance. Thus the pilot may tack the apparatus and control its altitude. The use of a streamlined blimp and high aspect-ratio wings allows this Elevated Sailing Apparatus to achieve the low drag angle necessary for high-speed sailing.

DRAWINGS—FIGURES

Figure 2:
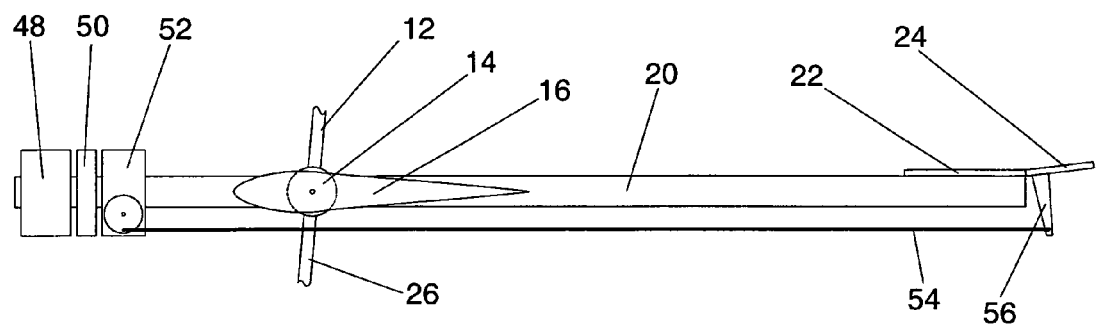
Figure 3:
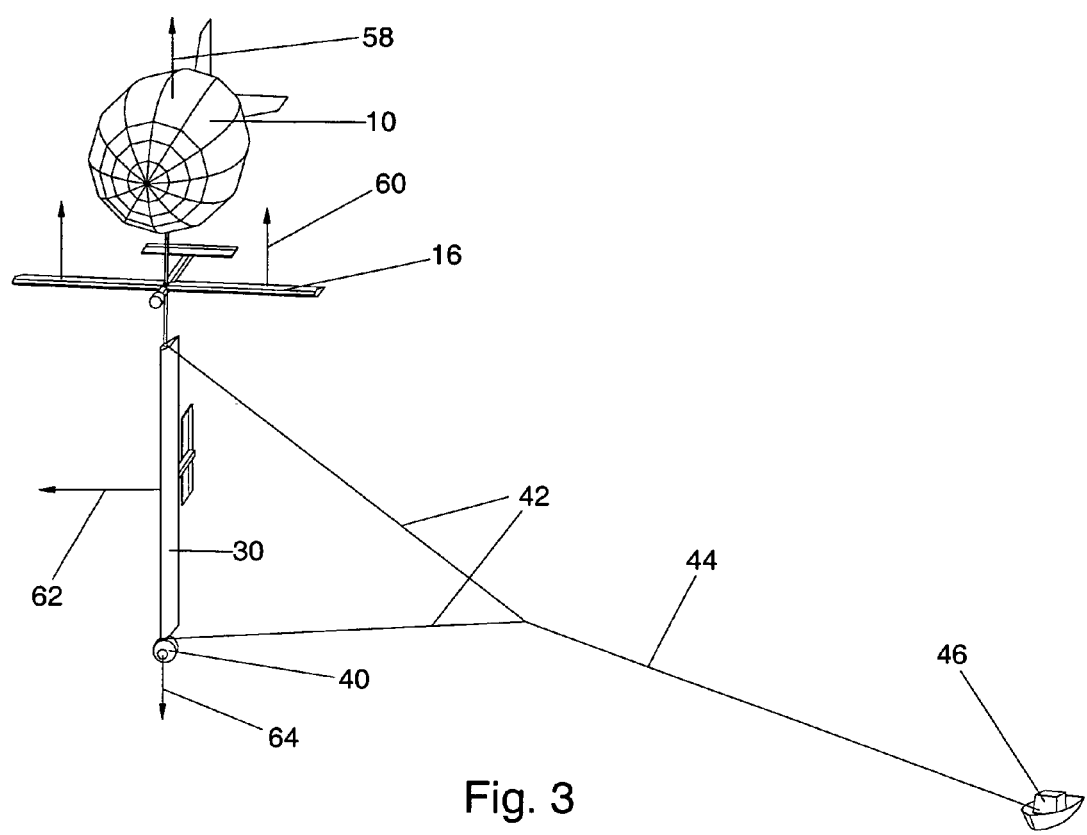
Figure 4:
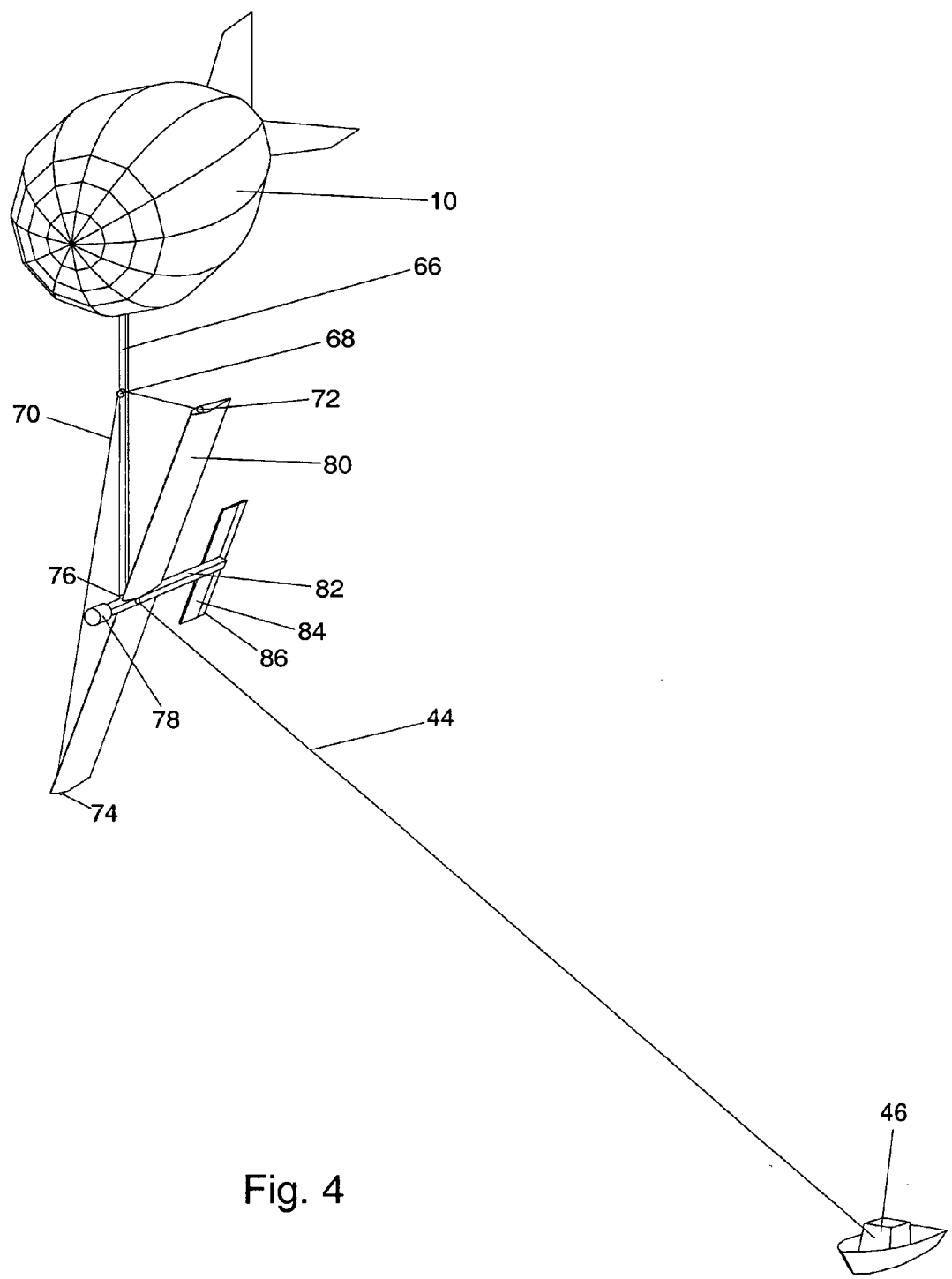
Figure 5:
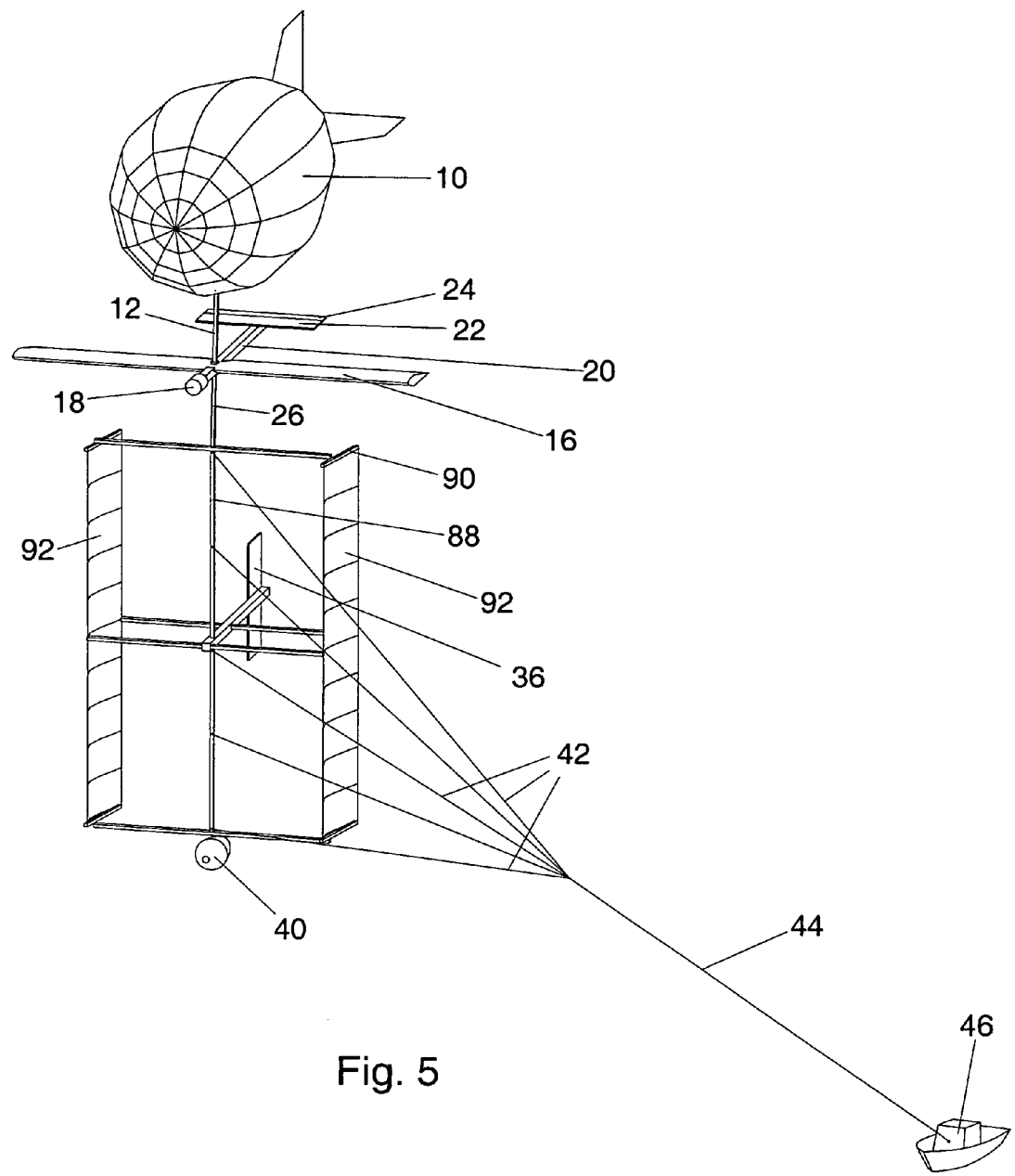

FIG. 1 shows a perspective view of the sailing apparatus.
FIG. 2 shows a means for orienting and controlling the lifting wing using a stabilizer, control surface and radio control system.
FIG. 3 shows a frontal perspective view of the sailing apparatus with the lifting and propulsive forces.
FIG. 4 shows an alternative embodiment of the invention with a single combined lifting and propulsive wing.
FIG. 5 shows an alternative embodiment of the invention with two propulsive sails.

DRAWINGS—REFERENCE NUMERALS 10 blimp
12 upper pylon
14 pivot
16 lifting wing
18 counterweight
20 spar
22 horizontal stabilizer
24 horizontal control surface
26 lower pylon
28 upper attachment point
30 propulsive wing
32 lower attachment point
34 spar
36 vertical stabilizer
38 vertical control surface
40 ballast weight
42 harness
44 tether
46 boat 48 battery
50 radio control receiver
52 radio control servo
54 push rod
56 control horn
58 static lift
60 dynamic lift
62 propulsive force
64 static weight
66 pylon
68 control pulley
70 control line
72 port attachment point
74 starboard attachment point
76 pivot
78 combined ballast weight and counterweight
80 combined lifting and propulsive wing
80 spar
84 stabilizer
86 control surface
88 mast
90 boom
92 propulsive sail

DETAILED DESCRIPTION OF THE INVENTION

Preferred Embodiment

A preferred embodiment of the invention can be readily understood by referring to FIG. 1. A streamlined blimp (or dirigible, or airship) 10 containing a lighter-than-air gas (helium or hydrogen), and having directional fins, has a horizontal lifting wing 16 suspended beneath it. Suspended beneath lifting wing 16 is a vertical propulsive wing (or sail) 30. The lower side of propulsive wing 30 is weighted with a ballast weight 40 so that the propulsive wing 30 will remain substantially vertical. A tether 44 connects a boat 46 to both sides of propulsive wing 30 via a harness 42. Both lifting wing 16 and propulsive wing 30 have stabilizers 22 and 36 to orient them to the oncoming wind and maintain their angles-of-attack. Stabilizers 22 and 36 have control surfaces 24 and 38 and a conventional radio control system (not shown) to adjust the angles-of-attack of lifting wing 16 and propulsive wing 30 so that the pilot can control the apparatus.

Blimp 10 has an upper pylon 12 attached to its lower surface. Upper pylon 12 is connected to lifting wing 16 via a pivot 14 at the center-of-lift of lifting wing 16. Lifting wing 16 has a spar 20 connecting it to a counterweight 18 and horizontal stabilizer 22 so that lifting wing 16 is balanced about the pivot 14. Lifting wing 16 will be free to rotate about the pivot 14 and will be oriented to the oncoming wind by the horizontal stabilizer 22. A conventional radio control system (not shown) can control the horizontal control surface 24 and hence adjust the angle-of-attack of lifting wing 16. The pilot can thus control the lifting force generated by the apparatus and hence control its altitude. Lifting wing 16 is connected to a lower pylon 26 via the pivot 14. The lower pylon 26 in connected to the propulsive wing 30 by an upper attachment point 28. Upper and lower attachment points 28 and 32 are located on each side of propulsive wing 30 on the line of its center-of-lift. Lower attachment point 32 is connected to ballast weight 40. Propulsive wing 30 has a spar 34 connecting it to vertical stabilizer 36 to orient it to the oncoming wind. The harness 42 is connected to upper attachment point 28 and lower attachment point 32 and to tether 44. Tether 44 transfers the propulsive force to boat 46. Propulsive wing 30 will be balanced with ballast weight 40 such that its center-of-gravity resides on the line of its center-of-lift. Propulsive wing 30 will be free to rotate about the upper and lower attachment points 28 and 32 so that it will be oriented to the oncoming wind by the vertical stabilizer 36. A conventional radio control system (not shown) can control the vertical control surface 38 and hence adjust the angle-of-attack of propulsive wing 30. The pilot can thus control the propulsive force generated by the apparatus and the apparatus can be tacked.

Preferred Method for Stabilization and Control

FIG. 2 shows a preferred method for stabilizing and controlling lifting wing 16. A conventional radio control system including a battery 48, a receiver 50 and a servo 52 are used to adjust control surface 24 via a pushrod 54 and a control horn 56. A similar method would be used to stabilize and control propulsive wing 30. There are many alternative methods for stabilization and control known to the art including canard wings, bridle arrangements and weighting arrangements.

Alternative Embodiments

FIG. 4 shows an alternative embodiment of the invention using a single combined lifting and propulsive wing 80 that is set at an inclined angle so that it produces both lifting and propulsive forces. Combined wing 80 is suspended beneath blimp 10 by a pylon 66 and it is attached to pylon 66 by a pivot 76 at its center-of-lift. Combined wing 80 has a spar 82 connecting it to a stabilizer 84 and a combined counterweight and ballast weight 78. Combined wing 80 is balanced about the pivot 76 so that it is free to rotate about pivot 76 and will be oriented to the oncoming wind by stabilizer 84. A conventional radio control system (not shown) can adjust a control surface 86 and hence control the angle-of attack of combined wing 80. A control line 70 is attached to each side of combined wing 80 at attachment points 72 and 74 located on the line of center-of-lift. Control line 70 can be adjusted by a control pulley 68 located on pylon 66. Control pulley 68 is controlled by a conventional radio control system and motor (not shown) such that the angle of inclination of combined wing 80 may be controlled by the pilot. Hence the ratio of lifting force to propulsive force can be adjusted, and combined wing 80 can be flipped from one side to the other so that the apparatus can be tacked.

FIG. 5 shows another alternative embodiment of the invention where there are two flexible propulsive sails 92, similar to those used with conventional sailboat sails.

The previous description describes several embodiments of the invention, but there are many variations, some of which will be described here:

(a) The blimp may include rigid structural members to improve the shape, or for structural reasons.
(b) The lifting and propulsive wings may be rigid or flexible airfoils. Flexible airfoils may have the form of a mast and sail, or that of an inflated kite or parachute.
(c) There are many different numbers and combinations of lifting and propulsive wings that can be used.
(d) The weight of propulsive wing 30 may be sufficient so that no further ballast weight 40 is required.
(e) Ballast weight 40 may comprise part of the payload for the apparatus.
(f) There are different methods for orienting the lifting and propulsive wings to the oncoming wind including a conventional trailing stabilizer, a preceding canard airfoil, a bridle arrangement, or a weighting arrangement.

(g) A conventional fin and rudder orthogonal to the stabilizer may be used to keep the wings directed into the wind.

(h) There are different methods for achieving remote control of the apparatus including radio, infrared, ultra-sonic, electrical wires or mechanical control lines.

(i) An automatic system may be used to maintain a constant altitude for the apparatus by sensing the altitude using radar or sonar and controlling the lifting wing to compensate for any deviation from the desired altitude in such a way that a substantially constant altitude is achieved.

(j) The harness 42 may have multiple attachments to distribute the propulsive force so that a lighter structure may be used for the propulsive wing.

Operation of the Invention

Some observations from sailing and aerodynamic theory:

(a) To sail fast (faster than the true wind speed) it is essential to have both a low aerodynamic and a low hydrodynamic drag-angle (high lift-to-drag ratio).

(b) The aerodynamic drag of a streamlined blimp is less than one tenth that of a spherical balloon having the same volume.

(c) For wings operating at high lift coefficients where induced drag predominates, reduced drag is highly dependent upon having a high aspect-ratio wing.

(d) High aspect-ratio wings are very sensitive to the angle-of-attack and are therefore more difficult to stabilize and control.

FIG. 3. shows a frontal perspective view of the preferred embodiment with the lifting and propulsive forces indicated. The term propulsive force used here refers to that force typically generated by a sail and largely opposed by the keel or centerboard of a boat.

The complete apparatus will be positively buoyant, so that in zero wind it will float up. Blimp 10 will be sized so that it can lift the entire weight of the apparatus.

Lifting wing 16 generates dynamic lift from the wind to maintain the altitude of the apparatus and to keep it from being pushed into the water by the propulsive and drag forces. The size of lifting wing 16 is chosen such that the apparatus will maintain a desired elevation.

The size of propulsive wing 30 is chosen such that a desired propulsive force and drag angle can be attained.

Blimp 10 and ballast weight 40 produce a vertical reference for the apparatus so that the lifting and propulsive forces can be controlled independently.

The dynamic-lift, propulsive force and (aerodynamic) drag of all elements of the apparatus will maintain the same ratio relative to each other as the wind speed changes. Therefore the apparatus will be substantially stable and maintain constant altitude. An automatic control system can be used to improve altitude keeping if necessary.

Conclusion Ramifications and Scope of the Invention

The invention disclosed describes an apparatus that may be used for high-speed sailing having achieved:

(a) Negligible heeling moment.

(b) Low drag-angle through the use of a streamlined blimp and high aspect-ratio lifting and propulsive wings.

(c) Operation over a large range of wind speed including zero wind.

(d) Effective control.

(e) Ease of launch and retrieval.

(f) Use of a single tether line.

Obviously many modifications and variations of the present invention are possible in light of the above teachings. It is therefore to be understood that within the scope of the appended claims the invention may be practiced otherwise than specifically described.

I claim:

1. A sailing apparatus for generating a propulsive force for a conveyance, comprising:

(a) a blimp containing a lighter than air gas (b) one or more horizontal wings suspended beneath said blimp (c) means for performing aerodynamic stabilization of said one or more horizontal wings (d) one or more vertical sails suspended beneath said blimp (e) means for performing aerodynamic stabilization of said one or more vertical sails (f) a tether connecting said vertical sails to the conveyance such that said horizontal wings generate dynamic-lifting force to keep the apparatus elevated, and such that said vertical sails generate propulsive force that is transferred along said tether to the conveyance.

2. The apparatus of claim 1 also comprising:

(a) means for controlling said aerodynamic stabilization of said horizontal wings by radio control (b) means for controlling said aerodynamic stabilization of said vertical sails by radio control such that the dynamic-lifting force and the propulsive force can be controlled remotely.

3. A sailing apparatus for generating a propulsive force for a conveyance, comprising:

(a) a blimp containing a lighter than air gas (b) one or more wings suspended beneath said blimp (c) a tether connecting said one or more wings to the conveyance (d) means for performing aerodynamic stabilization of said one or more wings (e) means for controlling said aerodynamic stabilization of said one or more wings by radio control (f) a ballast weight such that said one or more wings provide dynamic-lifting force and propulsive force to the conveyance and such that the forces generated by said one or more wings can be controlled remotely and such that said ballast weight establishes a vertical reference relative to said blimp such that the lifting and propulsive forces can be controlled independently.

4. A sailing apparatus for generating a propulsive force for a conveyance, comprising:

(a) a blimp containing a lighter than air gas (b) one or more wings suspended beneath said blimp (c) a tether connecting said one or more wings to the conveyance (d) means for performing aerodynamic stabilization of said one or more wings (e) means for controlling said aerodynamic stabilization of said one or more wings by radio control (f) a ballast weight to establish a vertical reference relative to said blimp such that said one or more wings provide dynamic-lifting force and propulsive force that is transferred along said tether to the conveyance and such that the dynamic-lifting and propulsive forces can be controlled independently.

* * * * *